United States Patent Office 3,387,654
Patented June 11, 1968

3,387,654
METHOD FOR DETERMINING OXYGEN REQUIREMENTS FOR IN-SITU COMBUSTION
John C. Todd, Tulsa, Okla., assignor to Sinclair Research, Inc., New York, N.Y., a corporation of Delaware
No Drawing. Filed Oct. 27, 1966, Ser. No. 589,843
3 Claims. (Cl. 166—4)

This invention relates to oil recovery processes and in particular to a method for determining the amount of oxygen required to propagate a thermal wave through underground hydrocarbon bearing formations.

It is known to produce normally liquid hydrocarbons from a reservoir by the use of underground combustion. In this method a part of the oil or other combustibles within the reservoir are ignited by suitable thermal means to establish a heat wave or combustion zone at the vicinity of one or more wells. This heat wave or combustion zone is then radially moved to other points in the reservoir by the injection of a free-oxygen-containing gas, such as air. As the combustion zone moves radially outward the combustion gases, oil and distillation products migrate in front of the combustion zone to an output well or wells from which they are removed for recovery of their valuable constituents.

One of the more important economic factors in thermal recovery process is the quantity of oxygen-containing gas, such as air, necessary to move the combustion front through a given volume of a reservoir and it is the object of this invention to provide a method for determining this requirement as an aid to evaluation of the suitability of the reservoir for thermal wave oil recovery methods. In aid of clarity, this description of the present invention will proceed with reference to the use of air as the oxygen-containing gas used to propagate the thermal wave within the reservoir. It will be remembered, however, that other free-oxygen-containing gases are equally suitable for use in the method described herein.

Previous attempts to determine the quantity of air required to propagate a thermal wave have consisted of various laboratory simulations of sub-surface conditions, but these methods are unreliable due to the inability to realize close similarity to actual reservoir conditions such as crude oil, rock formation, temperature and pressure. Another method previously used consists of a time consuming field experiment wherein several acres of a formation are thermally swept by a heat wave followed by an extensive coring program to determine the amount of displacement realized. This method requires a sweep of the significant formation volume and is costly and usually provides inaccurate results due to the practical impossibility of providing the number of cores necessary to accurately define the wave front.

In the improved method of the present invention the air requirement is determined after a combustion zone has been established in the reservoir adjacent an input well and while air is injected into the well in sufficient quantity to move the combustion zone radially through the formation. The determination is made by mixing with the air, in a constant ratio, a gaseous substance which will react with the gases generated within the combustion zone with the consequent formation of a precipitate. The amount of precipitate formed within a given volume of the reservoir is indicative of the amount of air used. After the field burning process has progressed for a short time, burning may be discontinued, a core taken in the portion of the reservoir swept by the combustion zone, and an analysis conducted to determine the amount of precipitate present per unit volume of reservoir matrix which in turn provides a measure of the volume of air required to propagate a thermal wave through a given volume of the reservoir. The number of cores required in this process is substantially less than the number required in prior methods.

The gaseous substance injected with the air to form a precipitate must be unreactive with the formation or unabsorbed by the formation until it gets to the combustion zone, resist oxidation and react with the gases, or other product of combustion, present within the combustion zone at the conditions prevailing therein to form precipitate which is stable under burning conditions which often includes temperatures up to about 1500° F. Compounds containing fluorine, chlorine, boron, oxygen, bromine and iodine frequently exhibit these properties. An example of a suitable substance is sulfur hexafluoride.

The amount of gaseous substance, e.g. $SF_6$ injected with the air is in general an amount sufficient to react and produce an amount of precipitate sufficient to accurately measure and may be from about 10 to 200 or 300 or more parts per million parts of air. It is only necessary that an easily detected precipitate be formed. When sulfur hexafluoride is injected, the amount thereof should be substantially less than the hydrogen sulfide available within the combustion zone. About fifty parts of sulfur hexafluoride per million parts of air gives excellent results.

This gas is very stable at high temperatures, resists oxidation and reacts readily with hydrogen sulfide at elevated temperatures according to the equation:

$$3H_2S + SF_6 = 6HF + 4S$$

This gas thus has the properties necessary to permit its passage through the heated trailing edge of the combustion zone to the burning front. At the burning front crude oil is cracked at temperatures above 700° F. at which temperature high molecular weight mercaptans, sulfides and di-sulfides decompose to form hydrogen sulfide. The hydrogen sulfide formed at the burning front reacts with the sulfur hexafluoride according to the above reaction and the hydrogen fluoride produced immediately reacts with the reservoir matrix materials to form heat stable metallic fluorides.

The matrix materials frequently found in hydrocarbon bearing formations include calcium carbonate, sodium chloride, iron and aluminum oxides, and sodium and other aluminum silicates. Typical reactions of hydrogen fluoride with these materials to form stable metal fluorides are as follows:

$$2HF + CaCO_3 = CaF_2 + H_2O + CO_2$$

$$HF + NaCl = NaF + HCl$$

$$6HF + Fe_2O_3 = 2AlF_3 + 3H_2O$$

$$4HF + Na(\text{Hydrous Aluminum Silicates}) = NaF + AlF_3 + H_2O + SiO_2 + \text{Silicates}$$

The last reaction above shown is intended to indicate a general reaction of HF with clay materials which decompose to form metallic fluorides. If the decomposition results in the formation of silicon tetrafluoride the water vapor will instantly react with the silicon tetrafluoride to form hydrogen fluoride which would again react with the metallic components according to the above reactions.

As disclosed above, sulfur hexafluoride injected, in a constant proportion to the injected air will form a stable fluoride within the reservoir. The amount of precipitate resulting in any part of the reservoir will be in proportion to the amount of air used to sweep that part of the reservoir and thus, assuming a uniform burning rate throughout the reservoir, the amount of precipitate remaining in a unit volume of the reservoir after passage of a thermal wave therethrough provides an indication of the amount of air required to propagate a thermal wave through a given volume of the reservoir, including the entire reservoir.

To illustrate this invention, the oxygen requirement for two five well patterns in each of which a combustion front exists around an input well having four output wells surrounding it is determined. The combustion front drives the hydrocarbons toward the output wells. The injected air stream for each pattern contains a constant composition of 48.36 parts per million $SF_6$ gas, 10 million cubic feet of air containing 186.3 pounds of $SF_6$ gas. In the first of these patterns, a core taken in an area swept by the front is analyzed for total fluorine and 1.5 grams of fluorine as solid fluorides are found in each cubic foot of reservoir. The air requirement is, accordingly, 10 million cubic feet per acre-foot of reservoir swept by the front. In the second pattern, 3.0 grams fluorine are found as fluorides per cubic foot of reservoir giving an air requirement of 20 million cubic feet per acre-foot of reservoir.

The method of the present invention can be successfully accomplished using only a single core to detect the presence of precipitate in the area through which a thermal wave is passed. Of course, additional cores may be taken and the results averaged out to provide a more accurate picture of the overall air requirements. However, in no case will the amount of cores required compare with the number previously required in field test methods. Further, it will be obvious that using the method of the present invention only a small area of the reservoir to be studied need be thermally swept in order to determine the air requirement for that reservoir. The reduction in burning time and number of cores required to practice the present invention provide important advantages over prior art methods.

Although the above description has proceeded with reference to the use of sulfur hexafluoride injected into air it is not intended that the present invention be so restricted. The injected gas as noted above may be any gas exhibiting the enumerated properties of stability and oxidation resistance and which reacts with the material found within combustion zone with the consequent formation of a precipitate. It is immaterial whether the precipitate is formed directly by a gaseous reaction or whether it results from a secondary reaction with the reservoir matrix materials.

What is claimed is:

1. A method for determining the amount of oxygen-containing gas required to propagate a thermal wave in a hydrocarbon bearing reservoir having an input well which includes establishing a combustion zone in the reservoir, injecting an oxygen-containing gas into said reservoir in sufficient quantity to move the combustion zone through said reservoir, injecting with said oxygen-containing gas and in constant ratio thereto a gaseous substance reactive with a material generated within the combustion zone by said combustion with the consequent formation of a precipitate, said precipitate being deposited in the formation in a volume in proportion to the air required to burn the fuel from said formation volume, and determining the amount of precipitate produced per unit volume of the reservoir.

2. The method of claim 1 wherein said gaseous substance is $SF_6$.

3. The method of claim 1 wherein said gaseous substance is $SF_6$ and said oxygen-containing gas is air, said $SF_6$ being injected in an amount of from about 10 to 300 parts per million parts of air.

References Cited
UNITED STATES PATENTS

| | | | |
|---|---|---|---|
| 2,382,471 | 8/1945 | Frey | 166—11 |
| 2,642,943 | 6/1953 | Smith et al. | 166—11 |
| 2,722,277 | 11/1955 | Crawford | 166—11 |
| 2,800,183 | 7/1957 | Jenkins | 166—4 |
| 2,843,207 | 7/1958 | Clewell | 166—4 |
| 3,156,299 | 11/1964 | Trantham | 166—11 |
| 3,044,543 | 7/1962 | Ramey | 166—4 |
| 3,225,827 | 12/1965 | Prats | 166—11 |
| 3,208,516 | 9/1965 | Prats | 166—4 |

STEPHEN J. NOVOSAD, *Primary Examiner.*